United States Patent
Zhang (10) Patent No.: US 11,403,819 B2
(45) Date of Patent: Aug. 2, 2022

(54) THREE-DIMENSIONAL MODEL PROCESSING METHOD, ELECTRONIC DEVICE, AND READABLE STORAGE MEDIUM

(71) Applicant: GUANGDONG OPPO MOBILE TELECOMMUNICATIONS CORP., LTD., Guangdong (CN)

(72) Inventor: Gong Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/173,722

(22) Filed: Feb. 11, 2021

(65) Prior Publication Data

US 2021/0174587 A1 Jun. 10, 2021

Related U.S. Application Data

(63) Continuation of application No. PCT/CN2019/091543, filed on Jun. 17, 2019.

(30) Foreign Application Priority Data

Aug. 16, 2018 (CN) .................. 201810934014.9

(51) Int. Cl.
  *G06T 19/00* (2011.01)
  *G06T 17/20* (2006.01)
  *G06T 1/60* (2006.01)

(52) U.S. Cl.
  CPC .............. *G06T 17/205* (2013.01); *G06T 1/60* (2013.01); *G06T 19/00* (2013.01); *G06T 2210/56* (2013.01)

(58) Field of Classification Search
  CPC ......... G06T 19/00; G06T 17/205; G06T 1/60; G06T 2210/56
  See application file for complete search history.

(56) References Cited

U.S. PATENT DOCUMENTS

| 6,285,372 | B1 | 9/2001 | Cowsar et al. |
| 7,215,810 | B2* | 5/2007 | Kaufmann .............. G06T 17/20 |
| | | | 382/154 |
| 9,615,647 | B2* | 4/2017 | Yamanashi ........... G06T 11/001 |
| | | | (Continued) |

FOREIGN PATENT DOCUMENTS

| CN | 101751689 A | 6/2010 |
| CN | 102306396 A | 1/2012 |
| | (Continued) | |

OTHER PUBLICATIONS

Lu et al., "Robust Mesh Denoising via Vertex pre-filtering and L1—median Normal Filtering", Computer Aided Geometric Design, 2017, 12 pages.

(Continued)

*Primary Examiner* — Xilin Guo
(74) *Attorney, Agent, or Firm* — Young Basile Hanlon & MacFarlane, P.C.

(57) ABSTRACT

Provided are a three-dimensional model processing method, an electronic device, and a readable storage medium. The method comprises: obtaining a three-dimensional model, wherein the three-dimensional model comprises a plurality of key points and a plurality of subdivision planes obtained by connecting adjacent key points as vertices; for each region in the three-dimensional model, according to the angle information of the subdivision plane in each region, determining a corresponding target key point density of each region; according to the corresponding target key point (Continued)

density of each region, adjusting the key point density of a corresponding region in the three-dimensional model.

20 Claims, 7 Drawing Sheets

(56) References Cited

U.S. PATENT DOCUMENTS

2013/0121564 A1* 5/2013 Kitamura ................ G01S 17/42
382/154
2016/0071327 A1 3/2016 Wu et al.

FOREIGN PATENT DOCUMENTS

| CN | 103236064 A | 8/2013 |
|---|---|---|
| CN | 103729872 A | 4/2014 |
| CN | 105469446 A | 4/2016 |
| CN | 106157373 A | 11/2016 |
| CN | 106408665 A | 2/2017 |
| CN | 107122705 A | 9/2017 |
| CN | 107729806 A | 2/2018 |
| CN | 107784674 A | 3/2018 |
| CN | 107958481 A | 4/2018 |
| CN | 109102559 A | 12/2018 |
| CN | 109191584 A | 1/2019 |

OTHER PUBLICATIONS

Vorstaz et al., "Dynamic Remeshing and Applications", Max-Planck-Institut tur Informatik Saarbrucken, Germany, 2003, 9 pages.
Zhou et al., "Efficient Topology Preserving Triangular Remeshing Algorithm with Adaptive Vertices Insertion", Applied Mathematical Modelling, vol. 40, 2016, pp. 5421-5430.
Greg Truk, "Re-Tiling Polygonal Surfaces", Computer Graphics, vol. 26 No. 2, Jul. 1992, 10 pages.
Wu et al., "Review of Estimation on Vertex Normal Vector and Discrete Curvature of Triangular Mesh", 3rd International Conference on Mechatronics and Information Technology (ICMIT 2016), 4 pages.
Extended European Search Report for EP Application 19850109.0 dated Nov. 17, 2021. (11 pages).
Chinese First Office Action with English Translation for Chinese Application No. 201710057059.8, dated Jan. 14, 2020 (18 pages).
Chinese Second Office Action with English Translation for Chinese Application No. 201710057059.8, dated Apr. 24, 2020 (17 pages).
International search report with English Translation for International Application No. PCT/CN2019/091543, dated Sep. 26, 2019 (14 pages).
Notification to Grant Patent Right for Invention with English Translation for Chinese Application No. 201710057059.8, dated Aug. 10, 2020 (6 pages).

* cited by examiner

```
┌─────────────────────────────────────────────────┐
│  A three-dimensional model is obtained. The three-│──101
│  dimensional model includes a plurality of key    │
│  points, and a plurality of subdivision planes    │
│  obtained by connecting adjacent key points as    │
│  vertices.                                        │
└─────────────────────────────────────────────────┘
                        │
                        ▼
┌─────────────────────────────────────────────────┐
│  For each area in the three-dimensional model,   │──102
│  a target key point density corresponding to     │
│  each area is determined based on an angle       │
│  information of the subdivision planes in each   │
│  area.                                           │
└─────────────────────────────────────────────────┘
                        │
                        ▼
┌─────────────────────────────────────────────────┐
│  A key point density of each area in the three-  │──103
│  dimensional model is adjusted based on the      │
│  target key point density in the corresponding   │
│  area.                                           │
└─────────────────────────────────────────────────┘
```

THREE-DIMENSIONAL MODEL PROCESSING METHOD, ELECTRONIC DEVICE, AND READABLE STORAGE MEDIUM

CROSS-REFERENCE TO RELATED APPLICATION(S)

The present application is a continuation-application of International (PCT) Patent Application No. PCT/CN2019/091543, filed on Jun. 17, 2019, which claims priority of Chinese Patent Application No. 201810934014.9, filed on Aug. 16, 2018, the entire contents of both of which are hereby incorporated by reference.

TECHNICAL FIELD

The present disclosure relates to the field of mobile terminals, and in particular to a three-dimensional model processing method, electronic device, and readable storage medium.

BACKGROUND

Three-dimensional (3D) model reconstruction is to establish a mathematical model suitable for computer representation and processing. It is the basis for processing, operating and analyzing its properties in a computer environment. It is also a key technology for establishing virtual reality in the computer to express the objective world. Usually, key points in the three-dimensional model are processed to realize the reconstruction of the model.

In actual operation, a same key point density is used everywhere in the 3D model. The configuration of the key point density has a greater influence on the presentation of the 3D model.

SUMMARY

In a first aspect, a three-dimensional model processing method is provided, comprising: obtaining a three-dimensional model; wherein the three-dimensional model comprises a plurality of key points, and a plurality of subdivision planes obtained by connecting adjacent key points as vertices; the three-dimensional model comprises a plurality of areas; for each area in the three-dimensional model: determining a target key point density of each area based on angle information of the subdivision planes in each area; and adjusting a key point density of each area based on the target key point density of each area.

In a second aspect, an electronic device is provided, comprising: a memory, a processor, and a computer program stored in the memory and executable on the processor, wherein the processor executes the program to implement a three-dimensional model processing method as described above.

In a third aspect, a computer-readable storage medium is provided, storing a computer program, wherein the computer program is executed by a processor to implement a three-dimensional model processing method as described above.

Additional aspects and advantages of the present disclosure will be given in part in the following description, in part as will become apparent from the following description, or as will be learned through the practice of the present disclosure.

BRIEF DESCRIPTION OF DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

The embodiments of the present disclosure are described in detail below. Examples of the embodiments are shown in the drawings, in which the same or similar reference numerals indicate the same or similar elements or elements having the same or similar functions throughout. The embodiments described below with reference to the drawings are exemplary, and are intended to explain the present disclosure, and should not be construed as limiting the present disclosure.

The three-dimensional model processing method, apparatus, electronic device, and readable storage medium of the embodiments of the present disclosure are described below with reference to the drawings.

Figure 1:
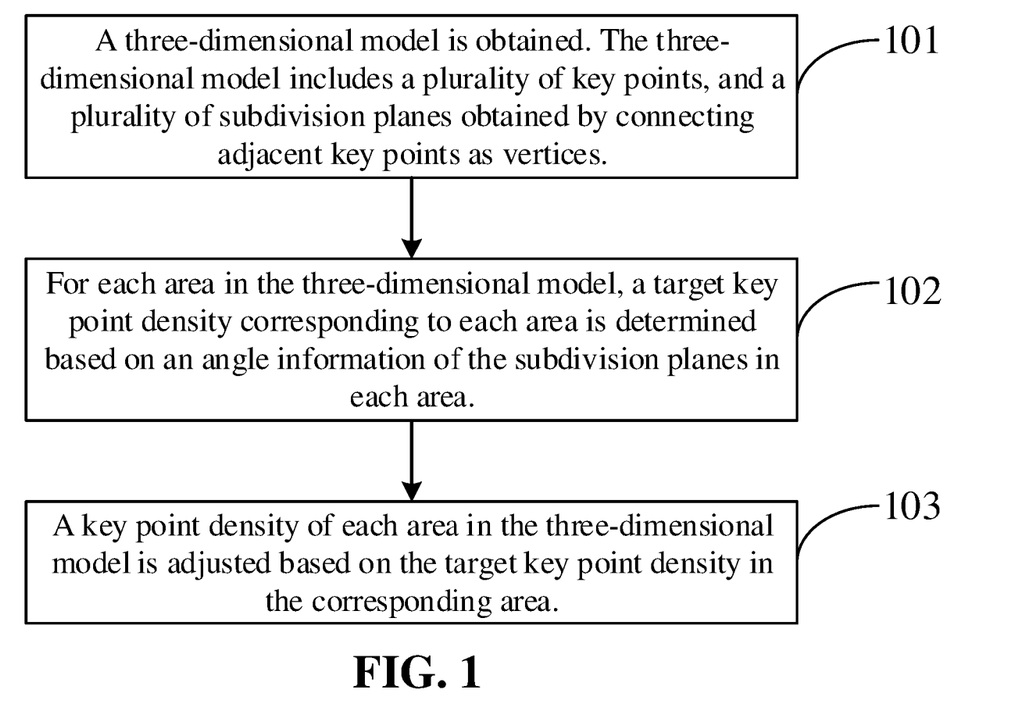
FIG. 1 is a flow chart of a three-dimensional model processing method according to an embodiment of the present disclosure.

FIG. 1 is a flow chart of a three-dimensional model processing method according to an embodiment of the present disclosure.

In the embodiments of the present disclosure, the electronic device may be a hardware device with various operating systems, touch screens, and/or display screens, such as mobile phones, tablet computers, personal digital assistants, wearable devices, and the like.

The three-dimensional model processing method may include operations at blocks illustrated in FIG. 1.

At block 101: A three-dimensional model is obtained. The three-dimensional model includes a plurality of key points, and a plurality of subdivision planes obtained by connecting adjacent key points as vertices.

The three-dimensional model obtained in the embodiment includes multiple key points and multiple subdivision planes obtained by connecting adjacent key points as vertices. The key points and the subdivision planes may be expressed in the form of three-dimensional coordinates.

As an example, the three-dimensional model acquired in this embodiment may be a three-dimensional model of a human face. The acquisition of the three-dimensional model of a human face is obtained by performing three-dimensional reconstruction based on depth information and facial images, rather than simply obtaining the red-green-blue (RGB) data and depth data.

In some embodiments, the depth information and color information corresponding to the two-dimensional face image may be fused to obtain the three-dimensional mode of human face. Specifically, based on the face key point detection technology, the key points of the human face may be extracted from the depth information and the key points of the human face may be extracted from the color information. Then, the extracted key points from the depth information and the extracted key points from the color information are processed by registration and key point fusion. Finally, the three-dimensional model of the human face is generated based on the fused key points. The key point may be a conspicuous point on a human face, or a point at a key position. For example, the key point may be the corner of the eye, the tip of the nose, the corner of the mouth, etc.

Further, based on face key point detection technology, a key point recognition may be performed on the face image to obtain the key points corresponding to the face image, such that the multiple subdivision planes may be obtained by connecting the adjacent key points as vertices according to relative positions of each key point in the three-dimensional space.

At block 102: For each area in the three-dimensional model, a target key point density corresponding to each area is determined based on an angle information of the subdivision planes in each area.

In the embodiment of the present disclosure, the three-dimensional model may be divided into multiple areas according to a preset radius. Each area includes multiple subdivision planes. In this way, the angle information of each subdivision plane may be obtained.

In some embodiments, the angle information of each subdivision plane may be an angle between adjacent subdivision planes. After obtaining each subdivision plane, the angle between adjacent subdivision planes may be determined to obtain the angle information of each subdivision plane.

Specifically, the angle information of the subdivision planes in each area have a certain correspondence with the flatness degree of each area. When the angle of the subdivision plane in an area is larger, the flatness degree of the area is lower. When the angle of the subdivision plane in an area is smaller, the flatness degree of the area is higher. When the difference between the flatness degrees of two adjacent areas is lower than a difference threshold, the two adjacent areas are merged, where the difference threshold is preset based on the overall structure of the three-dimensional model.

As an example, in the three-dimensional model of human face, the angle between two adjacent subdivision planes in each area may be calculated to determine the flatness degree of each area of the face. For example, when two adjacent subdivision planes in a certain area are in the facial area of the human face, the angle between the adjacent subdivision planes may be 2 degrees, indicating that the facial area of the face is relatively flat. When one of two adjacent subdivision planes in a certain area is in the facial area of the human face and the other is on the nose, the angle between the adjacent subdivision planes may be 60 degrees, indicating that the flatness degree of the area is relatively low.

Based on the flatness degree of each area in the determined three-dimensional model, the density of corresponding target key points in each area is further determined. Specifically, when the area is determined to be relatively flat, the corresponding target key points in the area may be configured relatively less. When the flatness degree in the area is determined to be relatively low, the corresponding target key points in the area may be configured relatively more.

As an example, for the determination of the target key point density in the three-dimensional model of human face, in a relatively flat area, fewer target key points may identify the face model of the area. Therefore, for a relatively flat face, a forehead area, the density of target key points may be configured relatively low. However, for areas with rich details such as eyes and lips, fewer target key points may not clearly identify the face model of the area, so the set target key point density shall be relatively high.

At operation 103: A key point density of each area in the three-dimensional model is adjusted based on the target key point density in the corresponding area.

Specifically, the current key point density in each area of the three-dimensional model is compared with the target key point density in the corresponding area, such that the key point density in each area of the three-dimensional model is adjusted.

In some embodiments, the key point density of an area in the three-dimensional model is higher than the corresponding target key point density, and some key points in the area are required to be deleted. After deleting some key points, the key point density in the area is less than or equal to the corresponding target key point density. The adjacent key points of the key points remained in the area are reconnected as vertices.

According to the embodiment of the present disclosure, a three-dimensional model is obtained. The three-dimensional model includes a plurality of key points, and a plurality of subdivision planes obtained by connecting adjacent key points as vertices. For each area in the three-dimensional model, a target key point density corresponding to each area is determined based on an angle information of the subdivision planes in each area. A key point density of each area in the three-dimensional model is adjusted based on the target key point density in a corresponding area. In the present disclosure, by adjusting the density of key points in the three-dimensional model, different key point densities are applied in different areas, which maintains the detail accuracy of the three-dimensional model and reduces the number of key points of the entire model, thereby reducing the memory usage and increasing the processing speed.

In some embodiments, for each area in the three-dimensional model, the flatness degree of each area is determined based on an angle information of the subdivision planes in each area and the target key point density corresponding to each area is thus determined. In order to accurately determine the flatness degree of each area in the three-dimensional model, the flatness degree of each area is determined based on an angle between normal vectors of adjacent vertices in each area of the three-dimensional model. The operation 102 may specifically include the following sub-operations at blocks illustrated in FIG. 2.

Figure 2:
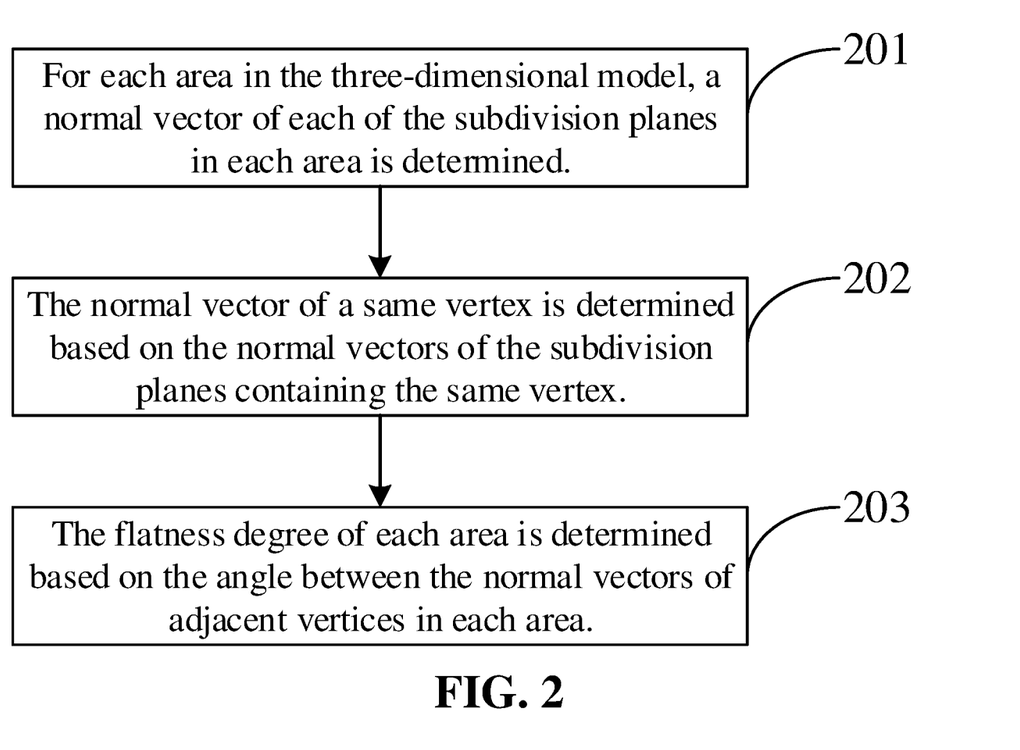
FIG. 2 is a flow chart of determining a flatness degree of each area according to an embodiment of the present disclosure.

At block 201: For each area in the three-dimensional model, a normal vector of each of the subdivision planes in each area is determined.

In the embodiment of the present disclosure, the three-dimensional model may be divided into multiple areas according to a preset radius, and adjacent key points are connected as vertices in each area to obtain multiple subdivision planes.

Further, after the subdivision planes of each area are obtained, the normal vector of each subdivision plane is further determined. The normal vector of a plane is an important vector for determining the position of the plane and refers to a non-zero vector perpendicular to the plane.

At block 202: The normal vector of a same vertex is determined based on the normal vectors of the subdivision planes containing the same vertex.

Specifically, when multiple subdivision planes in the three-dimensional model contain a same vertex, the normal vectors of the multiple subdivision planes containing the same vertex are summed, and then the normal vector obtained by the summation is the normal vector of the vertex.

For example, for a vertex X in the three-dimensional model, there are three subdivision planes A, B, and C in the model that also contain vertex X. After determining the normal vector of the subdivision planes A, B, and C, the normal vectors are summed, and the vector obtained by the summation is the vector of vertex X.

It should be noted that in the three-dimensional model, the reflection of light depends on the configuration of the vertex normal vectors. When the normal vector of each vertex is calculated correctly, the displayed three-dimensional model is smooth and shiny. Otherwise, the displayed three-dimensional model will show sharp edges and blurs.

At block 203: The flatness degree of each area is determined based on the angle between the normal vectors of adjacent vertices in each area.

Specifically, by determining the vertex normal vector in operation 202, the normal vector of each vertex in the three-dimensional model is determined. For each vertex in each area of the three-dimensional model, the angle between the normal vector of each vertex and the normal vector of the adjacent vertex is determined. Further, for the determined angle between the normal vector of each vertex and the normal vector of the adjacent vertex in a same area, an average value of the angles is calculated. Finally, it is determined whether the average value of the angle in each area is greater than a preset angle threshold, and then whether the area is flat is determined. The angle threshold is a value configured in advance based on the overall structure of the three-dimensional model.

When the average angle between the normal vector of each vertex and the normal vector of the adjacent vertex in a certain area in the three-dimensional model is greater than the preset angle threshold, the area is not flat. When the average value of the angle between the normal vector of each vertex and the normal vector of the adjacent vertex in a certain area in the three-dimensional model is less than the preset angle threshold, the area is flat.

In some embodiments, a same threshold may be configured for each area in the three-dimensional model to simplify the calculation.

In some embodiments, different areas in the three-dimensional model may also be configured with different thresholds, thereby improving the fineness of the model.

According to the embodiment of the present disclosure, for each area in the three-dimensional model, a normal vector of each of the subdivision planes in each area is determined. The normal vector of a same vertex is determined based on the normal vectors of the subdivision planes containing the same vertex. The flatness degree of each area is determined based on the angle between the normal vectors of adjacent vertices in each area. Thus, the flatness degree of each area of the three-dimensional model may be determined, thereby determining the number of vertices in each area, and further improving the processing efficiency of the three-dimensional model.

Figure 3:
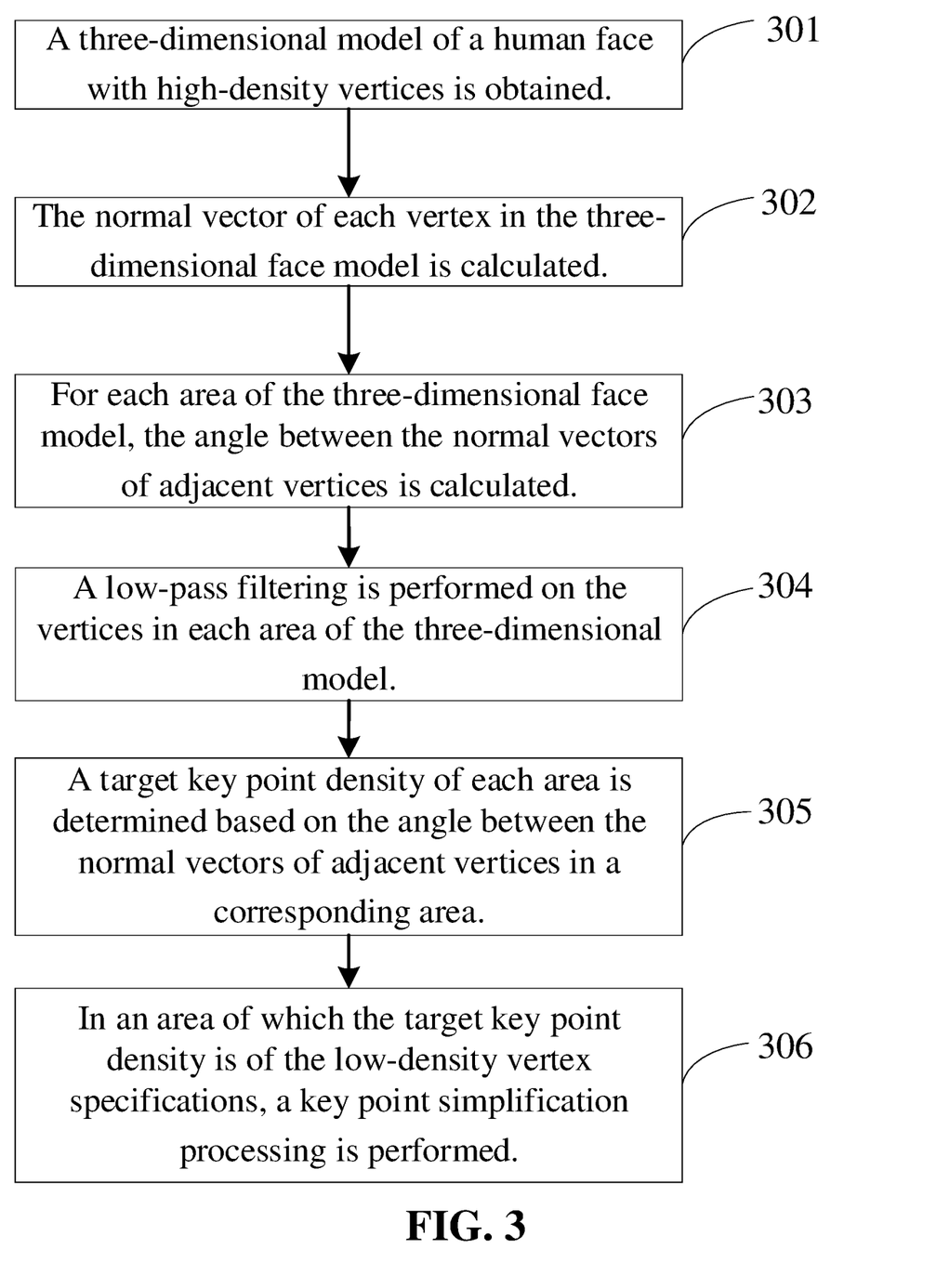
FIG. 3 is a flow chart of a three-dimensional model processing method according to another embodiment of the present disclosure.

As an example, in the embodiment of the present disclosure, the three-dimensional model of the human face is taken as an example. The three-dimensional model of the human face is simplified, thereby obtaining a simplified three-dimensional model. FIG. 3 is a flow chart of a three-dimensional model processing method according to another embodiment of the present disclosure.

The three-dimensional model processing method includes operations at blocks illustrated in FIG. 3.

At block 301: A three-dimensional model of a human face with high-density vertices is obtained. The three-dimensional model includes a plurality of key points, and a plurality of subdivision planes obtained by connecting adjacent key points as vertices.

In the embodiment of the present disclosure, the method for obtaining the three-dimensional model of the human face is similar to the method in operation 101 in the foregoing embodiment, and details are not described herein again.

At block 302: The normal vector of each vertex in the three-dimensional face model is calculated.

It should be noted that in the three-dimensional model, the reflection of light depends on the configuration of the vertex normal vectors. When the normal vector of each vertex is calculated correctly, the displayed three-dimensional model is smooth and shiny. Otherwise, the displayed three-dimensional model will show sharp edges and blurs.

In the embodiment of the present disclosure, the three-dimensional model is first divided into multiple areas according to a preset radius, and adjacent key points are connected as vertices in each area, thereby obtaining multiple subdivision planes, and further determining the normal vector of each subdivision plane.

Specifically, for each vertex in the three-dimensional model of the human face, all the subdivision planes containing the corresponding vertex are found, and the normal vectors of the subdivision planes are summed. The normal vector obtained by the summation is the normal vector of the vertex.

At block 303: For each area of the three-dimensional face model, the angles between the normal vectors of adjacent vertices are calculated.

Specifically, for each vertex in each area of the three-dimensional face model, the angle between the normal vector of each vertex and the normal vector of the adjacent vertex is obtained by calculation. Further, for the angle between the normal vector of each vertex determined and the normal vector of the adjacent vertex in the same area, the average value of the angles is calculated.

As a possible situation, the larger the calculated average value of the angles of a certain area, the more detailed the area is, such as eyes and lips.

As another possible situation, the calculated average value of the angles of a certain area is small, indicating that the area is relatively flat, such as the face, forehead and other flat areas of the human face.

At block 304: A low-pass filtering is performed on the vertices in each area of the three-dimensional model.

Specifically, for each vertex in each area of the three-dimensional model of the human face, after calculating the angle between the normal vector of each vertex and the normal vector of the adjacent vertex, low-pass filtering is performed based on the value of the angle. In this way, vertices corresponding to unusually high angles are filtered out. The larger the angle, the greater the change in the angle of the subdivision plane. By deleting the vertices with a large angle, each area may be smoother.

At block 305: A target key point density of each area is determined based on the angles between the normal vectors of adjacent vertices in the corresponding area.

In the embodiment of the present disclosure, the average value of the angles in each area of the three-dimensional model is compared with a preset angle threshold to determine the target key point density of each area, where the target key point density may be one of preset vertex density specifications. The preset vertex density specifications may include high-density vertex specifications and low-density vertex specifications. The preset angle threshold may be flexibly adjusted based on a desired effect, or may be configured with multiple levels of thresholds.

In a scenario, when the average value of the angle between the normal vector of each vertex and the normal vector of the adjacent vertex in a certain area of the three-dimensional model is greater than the preset angle threshold, the area is not flat enough. Therefore, the high-density vertex specifications may be configured to process the vertices in this area.

In another scenario, when the average value of the angle between the normal vector of each vertex and the normal vector of the adjacent vertex in a certain area of the three-dimensional model is less than the preset angle threshold, the area is flat. Therefore, the low-density vertex specifications may be configured to process the vertices in this area.

The above process of determining whether each area of the three-dimensional model is flat may be referred to as a process of binarizing each area of the three-dimensional model. Further, before performing the binarization process, when the difference between the flatness degrees of two adjacent areas is lower than a difference threshold, morphological processing and connected domain solution methods may be applied to merge the two adjacent areas. In this way, the amount of calculation of subsequent binarization and simplification of key points of the model may be reduced, and the areas of the three-dimensional model may be more coherent.

At block 306: In an area of which the target key point density is of the low-density vertex specifications, a key point simplification processing is performed to obtain a simplified three-dimensional model.

Specifically, the key points in the area are simplified, for example, one key point is remained from every four key points. In a relatively flat area, the simplification of key points may affect the imaging of the three-dimensional model and reduce the number of vertices of the entire three-dimensional model. Some key points in the corresponding area are deleted such that the key point density after the deletion is less than or equal to the target key point density. The adjacent key points of the key points retained in the corresponding area are reconnected as vertices to obtain a simplified three-dimensional model.

According to the embodiment of the present disclosure, a three-dimensional model of a human face with high-density vertices is obtained. The three-dimensional model includes a plurality of key points, and a plurality of subdivision planes obtained by connecting adjacent key points as vertices. The normal vector of each vertex in the three-dimensional face model is calculated. For each area of the three-dimensional face model, the angle between the normal vectors of adjacent vertices is calculated. A low-pass filtering is performed on the vertices in each area of the three-dimensional model. A target key point density of each area is determined based on the angle between the normal vectors of adjacent vertices in a corresponding area. In an area of which the target key point density is of the low-density vertex specifications, a key point simplification processing is performed to obtain a simplified three-dimensional model. Therefore, by configuring different vertex specifications for different areas of the human face, while maintaining the details of the face three-dimensional model, the number of vertices of the entire three-dimensional model is reduced, the memory usage is reduced, and the processing speed of the face three-dimensional model is improved.

In order to implement the above embodiments, the present disclosure also provides a three-dimensional model processing apparatus.

Figure 4:
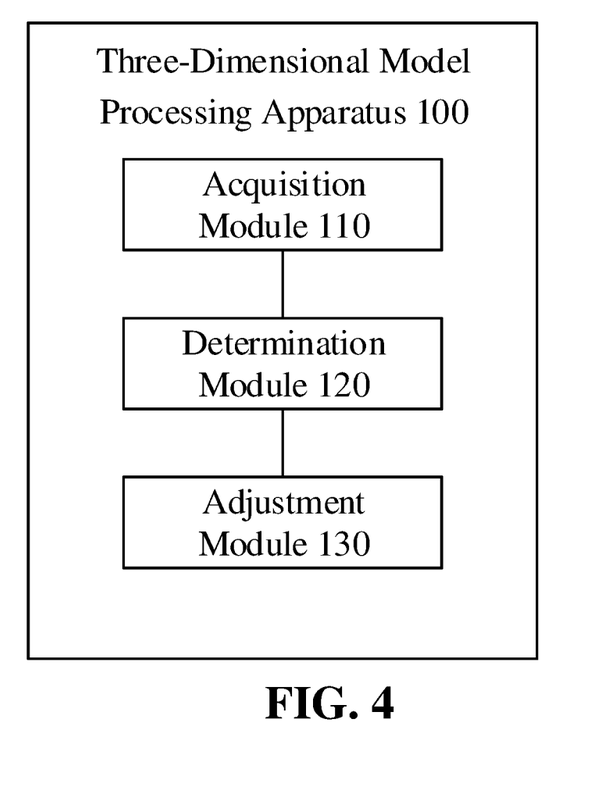
FIG. 4 is a structural schematic view of a three-dimensional model processing apparatus according to an embodiment of the present disclosure.

FIG. 4 is a structural schematic view of a three-dimensional model processing apparatus according to an embodiment of the present disclosure.

As shown in FIG. 4, the three-dimensional model processing apparatus 100 includes: an acquisition module 110, a determination module 120, and an adjustment module 130.

The acquisition module 110 is configured to obtain a three-dimensional model. The three-dimensional model includes a plurality of key points, and a plurality of subdivision planes obtained by connecting adjacent key points as vertices.

The determination module 120 is configured to determine a target key point density corresponding to each area based on an angle information of the subdivision planes in each area, for each area in the three-dimensional model.

The adjustment module 130 is configured to adjust a key point density of each area in the three-dimensional model based on the target key point density in a corresponding area.

In some embodiments, the determination module 120 is also configured to determine a flatness degree of each area according to an angle information of the subdivision planes in each area of the three-dimensional model and determine the corresponding target key point density based on the flatness degree of each area.

In some embodiments, the determination module 120 is also configured to determine a normal vector of each of the subdivision planes in each area, for each area in the three-dimensional model; determine the normal vector of a same vertex based on the normal vectors of the subdivision planes containing the same vertex; determine the flatness degree of each area based on the angle between the normal vectors of adjacent vertices in each area.

In some embodiments, the determination module 120 further includes: a determination unit, configured to determine the angle between the normal vector of each vertex and the normal vector of the corresponding adjacent vertex in each area; a calculation unit, configured to calculate the average value of the angles based on the angle between the normal vector of each vertex and the normal vector of the corresponding adjacent vertex; a judging unit, configured to determine whether an area is flat based on whether the average value of the angle is greater than a preset angle threshold.

In some embodiments, the determination unit is specifically configured to sum the normal vectors of the subdivision planes containing the same vertex and determine the normal vector based on the normal vector obtained by the summation.

Figure 5:
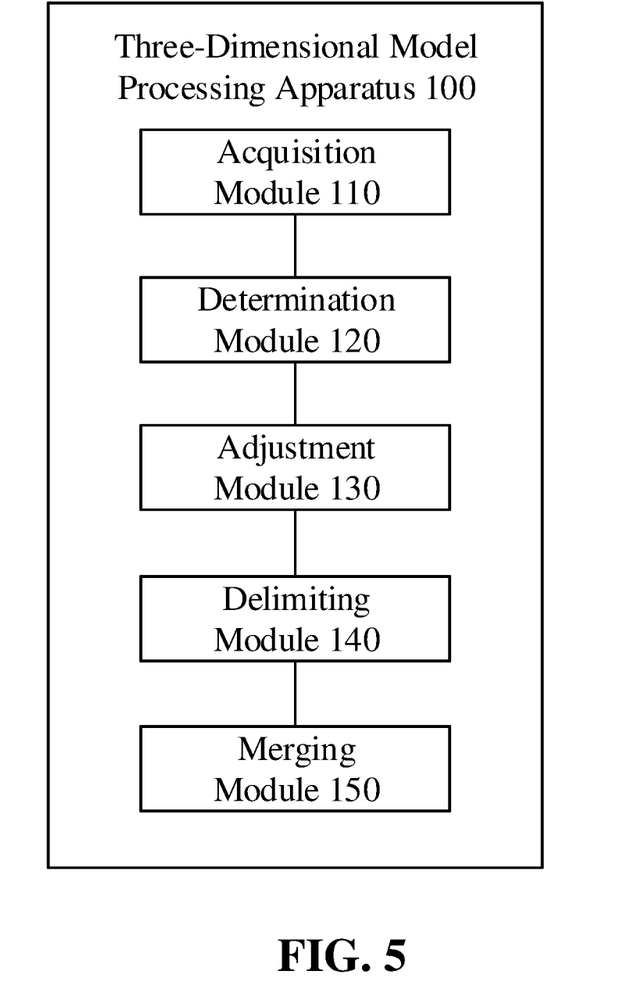
FIG. 5 is a structural schematic view of a three-dimensional model processing apparatus according to another embodiment of the present disclosure.

In some embodiments, as shown in FIG. 5, the three-dimensional model processing apparatus 100 further includes: a delimiting module 140, configured to delimit each area in the three-dimensional model based on a preset radius; a merging module 150, configured to merge two adjacent areas when the difference between the flatness degree of the two adjacent areas is lower than a difference threshold.

In some embodiments, the adjustment module 130 is also configured to delete some key points in the corresponding area for the area of which the current key point density is higher than the target key point density, so that the key point density after the key point deletion is less than or equal to the target key point density; reconnect the adjacent key points of the key points retained in the corresponding area as vertices.

According to the embodiment of the present disclosure, a three-dimensional model is obtained. The three-dimensional model includes a plurality of key points, and a plurality of subdivision planes obtained by connecting adjacent key points as vertices. For each area in the three-dimensional model, a target key point density corresponding to each area is determined based on an angle information of the subdivision planes in each area. A key point density of each area in the three-dimensional model is adjusted based on the target key point density in a corresponding area. In the present disclosure, by adjusting the density of key points in the three-dimensional model, different key point densities are applied in different areas, which maintains the detail accuracy of the three-dimensional model and reduces the number of key points of the entire model, thereby reducing the memory usage and increasing the processing speed.

It should be noted that the foregoing explanation and description of the embodiments of the three-dimensional model processing method is also applicable to the three-dimensional model processing apparatus of this embodiment, and details are not described here.

In order to implement the above embodiments, the present disclosure also provides an electronic device including a memory, a processor, and a computer program stored in the memory and executable on the processor. When the processor executes the program, the three-dimensional model processing method as described in the foregoing embodiments is implemented.

Figure 6:
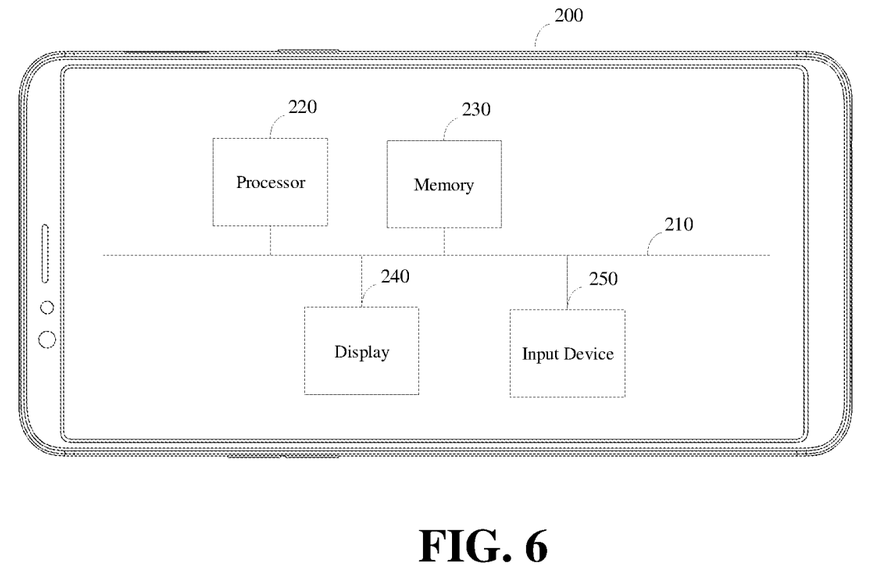
FIG. 6 is a schematic view of an inner structure of an electronic device according to an embodiment of the present disclosure.

FIG. 6 is a schematic view of an inner structure of an electronic device according to an embodiment of the present disclosure. The electronic device 200 includes a processor 220, a memory 230, a display 240, and an input device 250 connected through a system bus 210. The memory 230 of the electronic device 200 stores an operating system and computer readable instructions. The computer readable instructions can be executed by the processor 220 to implement a face recognition method as described in the embodiments of the present disclosure. The processor 220 is configured to provide calculation and control capabilities and support the operation of the entire electronic device 200. The display 240 of the electronic device 200 may be a liquid crystal display or an electronic ink display, etc. The input device 250 may be a touch layer covered on the display 240, or may be a button, a trackball or a touchpad arranged on a housing of the electronic device 200, or an external keyboard, touchpad or mouse. The electronic device 200 may be a mobile phone, a tablet computer, a notebook computer, a personal digital assistant, or a wearable device (such as a smart bracelet, smart watch, smart helmet, smart glasses), or the like.

Those skilled in the art can understand that the structure shown in FIG. 6 is only a schematic view of a part of the structure related to the disclosed solution and does not constitute a limitation on the electronic device 200 to which the disclosed solution is applied. The specific electronic device 200 may include more or fewer components than shown in the figure, or combine certain components, or have a different arrangement of components.

Figure 7:
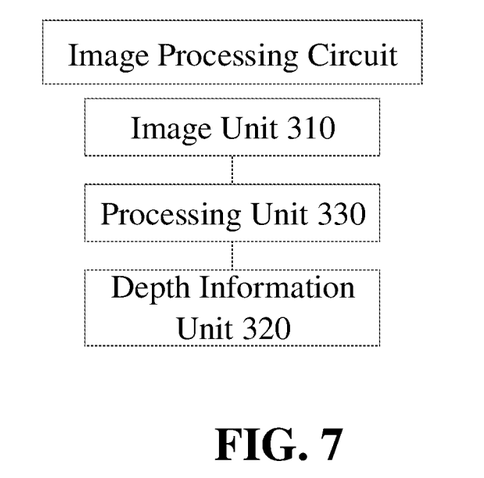
FIG. 7 is a structural schematic view of an image processing circuit according to an embodiment of the present disclosure.

In some embodiments, as shown in FIG. 7, FIG. 7 is a structural schematic view of an image processing circuit according to an embodiment of the present disclosure. The image processing circuit may be implemented with hardware and/or software components.

As shown in FIG. 7, the image processing circuit specifically includes: an image unit 310, a depth information unit 320 and a processing unit 330.

The image unit 310 is configured to output a two-dimensional image.

The depth information unit 320 is configured to output depth information.

In the embodiment of the present disclosure, the image unit 310 may obtain a two-dimensional image, and the depth information unit 320 may obtain depth information corresponding to the image.

The processing unit 330 is electrically connected to the image unit 310 and the depth information unit 320 respectively. The processing unit 330 is configured to identify a target three-dimensional template matching the image based on the two-dimensional image obtained by the image unit and the corresponding depth information obtained by the depth information unit; and output the information associated with the target three-dimensional module.

In the embodiment of the present disclosure, the two-dimensional image obtained by the image unit 310 may be sent to the processing unit 330. The depth information corresponding to the image obtained by the depth information unit 320 may be sent to the processing unit 330. The processing unit 330 may identify the target 3D template matching the image, and output the information associated with the target 3D module based on the image and the depth information. For a specific implementation process, reference may be made to the explanation of the method for processing the three-dimensional model in the foregoing embodiments of FIG. 1 to FIG. 3, and details are not described here.

Figure 8:
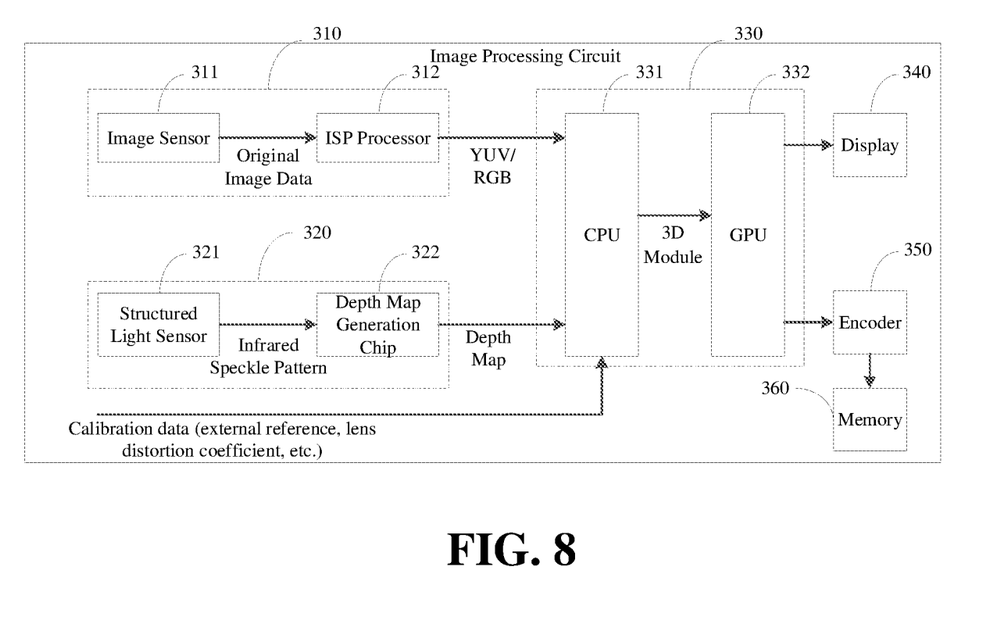
FIG. 8 is a structural schematic view of an image processing circuit according to another embodiment of the present disclosure.

In some embodiments, as shown in FIG. 8, on the basis of the embodiment shown in FIG. 7, the image processing circuit may further include elements as followed.

In some embodiments, the image unit 310 may specifically include: an image sensor 311 and an image signal processing (ISP) processor 312 that are electrically connected.

The image sensor 311 is configured to output original image data.

The ISP processor 312 is configured to output an image based on the original image data.

In an embodiment of the present disclosure, the original image data captured by the image sensor 311 is first processed by the ISP processor 312. The ISP processor 312 analyzes the original image data to capture image statistics that may be configured to determine one or more control parameters of the image sensor 311, the image statistics including images in YUV format or RGB format. The image sensor 311 may include a color filter array (such as a Bayer filter), and the corresponding photosensitive unit. The image sensor 311 may acquire the light intensity and wavelength information captured by each photosensitive unit and provide a set of original image data that can be processed by the ISP processor 312. After processing the original image data, the ISP processor 312 obtains an image in YUV format or RGB format and sends the image to the processing unit 330.

When processing the original image data, the ISP processor 312 may process the original image data pixel by pixel in various formats. For example, each image pixel may have a bit depth of 8, 10, 12, or 14 bits. The ISP processor 312 may perform one or more image processing operations on the original image data to collect statistical information about the image data. The image processing operation may be performed with same or different bit depth accuracy.

In some embodiments, the depth information unit 320 includes a structured light sensor 321 and a depth map generation chip 322 that are electrically connected.

The structured light sensor 321 is configured to generate an infrared speckle pattern.

The depth map generation chip 322 is configured to output depth information based on the infrared speckle map. The depth information includes the depth map.

In the embodiment of the present disclosure, the structured light sensor 321 projects speckle structured light onto a subject, obtains the structured light reflected by the subject, and forms an infrared speckle pattern based on the reflected structured light. The structured light sensor 321 sends the infrared speckle map to the depth map generation chip 322, such that the depth map generation chip 322 determines the morphological change of the structured light based on the infrared speckle map, and then determines the depth of the subject based on the morphological change to obtain a depth map. The depth map indicates the depth of each pixel in the infrared speckle map. The depth map generation chip 322 sends the depth map to the processing unit 330.

In some embodiments, the processing unit 330 includes a central processing unit (CPU) 331 and a graphics processing unit (GPU) 332 that are electrically connected.

The CPU 331 is configured to align the image and the depth map based on the calibration data and output a three-dimensional model based on the aligned image and depth map.

The GPU 332 is configured to determine the matching target three-dimensional template based on the three-dimensional model and output the information associated with the target three-dimensional template.

In the embodiment of the present disclosure, the CPU 331 obtains the image from the ISP processor 312 and the depth map from the depth map generation chip 322. In combination with the calibration data obtained in advance, the two-dimensional image may be aligned with the depth map, thereby determining depth information corresponding to each pixel in the image. Furthermore, the CPU 331 performs three-dimensional reconstruction based on the depth information and the image to obtain the three-dimensional model.

The CPU 331 sends the three-dimensional model to the GPU 332, such that the GPU 332 executes the three-dimensional model processing method as described in the foregoing embodiments based on the three-dimensional model, achieves key point simplification, and obtains the simplified three-dimensional model.

Specifically, the GPU 332 may determine the matching target three-dimensional template based on the three-dimensional model, mark the image based on the information associated with the target three-dimensional template, and output the image with the marked information.

Further, the image processing circuit may further include a display unit 340.

The display unit 340 is electrically connected to the GPU 332 and is configured to display the image with the marked information.

Specifically, the beautified image processed by the GPU 332 may be displayed on the display unit 340.

In some embodiments, the image processing circuit may further include: an encoder 350 and a memory 360.

In the embodiment of the present disclosure, the beautified image processed by the GPU 332 may also be encoded by the encoder 350 and stored in the memory 360, where the encoder 350 may be implemented by a coprocessor.

In some embodiments, the memory 360 may be multiple, or divided into multiple storage spaces. The image data processed by the GPU 332 may be stored in a dedicated memory or a dedicated storage space and may include a direct memory access (DMA) feature. The memory 360 may be configured to implement one or more frame buffers.

The above process will be described in detail below in conjunction with FIG. 8.

As shown in FIG. 8, the original image data captured by the image sensor 311 is first processed by the ISP processor 312. The ISP processor 312 analyzes the original image data to capture image statistics that may be configured to determine one or more control parameters of the image sensor 311, the image statistics including images in YUV format or RGB format; and sent to the CPU 331.

As shown in FIG. 8, the structured light sensor 321 projects speckle structured light onto a subject, obtains the structured light reflected by the subject, and forms an infrared speckle pattern based on the reflected structured light. The structured light sensor 321 sends the infrared speckle map to the depth map generation chip 322, such that the depth map generation chip 322 determines the morphological change of the structured light based on the infrared speckle map, and then determines the depth of the subject based on the morphological change to obtain a depth map. The depth map generation chip 322 sends the depth map to the CPU 331.

The CPU 331 obtains the two-dimensional image from the ISP processor 312, the depth map from the depth map generation chip 322. In combination with the calibration data obtained in advance, the two-dimensional image may be aligned with the depth map, thereby determining depth information corresponding to each pixel in the image. Furthermore, the CPU 331 performs three-dimensional reconstruction based on the depth information and the image to obtain the simplified three-dimensional model.

The CPU 331 sends the three-dimensional model to the GPU 332, such that the GPU 332 executes the three-dimensional model processing method as described in the foregoing embodiments based on the three-dimensional model, thereby realizing the simplification of the three-dimensional model and obtaining the simplified three-dimensional model. The simplified three-dimensional model processed by the GPU 332 may be displayed on the display unit 340, and/or stored in the memory 360 after being encoded by the encoder 350.

In order to implement the above embodiments, the present disclosure also provides a computer-readable storage medium in which a computer program is stored. When the program is executed by a processor, the three-dimensional model processing method as described in the foregoing embodiments of the present disclosure is implemented.

In the description of the specification, descriptions referring to the terms "one embodiment", "some embodiments", "examples", "specific examples", or "some examples" mean specific features, structure, materials or characteristics described in conjunction with the embodiment or examples are included in at least one embodiment or example of the present disclosure. In the specification, the schematic expression of the above terms does not necessarily refer to a same embodiment or example. Moreover, the specific features, structures, materials, or characteristics described may be combined in any suitable manner in any one or more embodiments or examples. In addition, without contradicting each other, those skilled in the art may combine different embodiments or examples and features of the different embodiments or examples described in this specification.

In addition, the terms "first" and "second" are for descriptive purposes only and cannot be understood as indicating or implying relative importance or implicitly indicating the number of indicated technical features. Thus, the features defined with "first" and "second" may include at least one of the features either explicitly or implicitly. In the description of the present disclosure, the meaning of "plurality" is at least two, for example, two, three, etc., unless specifically defined.

Any process or method description in a flowchart or otherwise described herein may be understood as representing a module, segment, or portion of code that includes one or more executable instructions for implementing custom logic functions or steps of a process. The scope of the preferred embodiments of the present disclosure includes additional implementations, in which the functions may not be performed in the order shown or discussed, including performing functions in a substantially simultaneous manner or in reverse order according to the functions involved, which shall be understood by those skilled in the art.

The logic and/or steps represented in the flowchart or otherwise described herein, for example, can be regarded as a sequenced list of executable instructions for implementing logical functions, and can be specifically implemented in any computer-readable medium, to be used by or in combination with an instruction execution system, apparatus, or device (such as a computer-based system, a system including a processor, or other systems that can fetch and execute instructions from an instruction execution system, apparatus, or device). For the purposes of this specification, a "computer-readable medium" may be any device that can contain, store, communicate, propagate, or transmit a program for use by or in connection with an instruction execution system, apparatus, or device. More specific examples of computer-readable media (non-exhaustive list) include the following: electrical connections (electronic devices) with one or more wires, portable computer cartridges (magnetic devices), random access memory (RAM), read only memory (ROM), erasable and editable read only memory (EPROM or flash memory), fiber optic devices, and portable compact disk read only memory (CDROM). In addition, the computer-readable medium may even be paper or other suitable medium on which the program can be printed. For example, by optically scanning the paper or other medium, followed by editing, interpretation, or other appropriate processing if necessary, the program may be obtained electronically and then stored in computer memory.

It should be understood that various parts of the present disclosure may be implemented in hardware, software, firmware, or a combination thereof. In the above embodiments, multiple operations or methods may be stored in memory and implemented by software or firmware executed by a suitable instruction execution system. For example, if implementing in hardware is as in another embodiment, the solution can be implemented using any one or a combination of the following techniques known in the art: discrete logic gates having logic gate circuits for implementing logic functions on data signals, dedicated integrated circuits with appropriate combinational logic gates, programmable gate arrays (PGA), field programmable gate arrays (FPGA), etc.

Those skilled in the art can understand that all or part of the operations carried in the method of the above embodiments can be completed by instructing relevant hardware through a program. The program can be stored in a computer-readable storage medium. When executed, one of the operations of the method embodiments or a combination thereof may be implemented.

In addition, each functional unit in each embodiment of the present disclosure may be integrated into one processing module, or each unit may exist alone physically, or two or more units may be integrated into one module. The above integrated modules can be implemented in the form of hardware or software function modules. If the integrated module is implemented in the form of a software functional module and sold or used as an independent product, it may also be stored in a computer-readable storage medium.

The storage medium mentioned above may be a read-only memory, a magnetic disk or an optical disk. Although the embodiments of the present disclosure have been shown and described above, it should be understood that the above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A method of three-dimensional model processing, comprising:
    obtaining a three-dimensional model; wherein the three-dimensional model comprises a plurality of key points, and a plurality of subdivision planes obtained by connecting adjacent key points as vertices; the three-dimensional model comprises a plurality of areas;
    for each area in the three-dimensional model:
    determining a target key point density of each area based on angle information of the subdivision planes in each area; and
    adjusting a key point density of each area based on the target key point density of each area.

2. The method according to claim 1, wherein the determining a target key point density of an area based on an angle information of subdivision planes in the area comprises:
    determining a flatness degree of each area based on the angle information of the subdivision planes in each area; and
    determining the target key point density based on the flatness degree of each area.

3. The method according to claim 2, wherein the angle information comprises normal vectors; each area comprises a plurality of vertices; the determining a flatness of the area based on the angle information of the subdivision planes in the area comprises:
    for each area in the three-dimensional model:
    determining a normal vector of each of the subdivision planes in each area;
    determining a normal vector of a certain vertex based on normal vectors of subdivision planes all containing the certain vertex, to respectively determine a normal vector of each of the vertices of each area; and
    determining the flatness degree of each area based on angles between normal vectors of adjacent vertices in each area.

4. The method according to claim 3, wherein the method further comprises:
before the determining the flatness degree of each area based on angles between normal vectors of adjacent vertices in each area, performing a low-pass filtering for each of the vertices in each area of the three-dimensional model.

5. The method according to claim 3, wherein the determining the flatness degree of each area based on angles between normal vectors of adjacent vertices in each area comprises:
determining the angles between the normal vector of each vertex and the normal vector of a correspondingly adjacent vertex in each area;
calculating an average value of the angles of each area based on the angles between the normal vector of each vertex and the normal vector of a correspondingly adjacent vertex in each area; and
determining whether each area is flat based on whether the average value of the angles of each area is greater than a preset angle threshold.

6. The method according to claim 5, wherein the preset angle threshold is individually configured for each area in the three-dimensional model.

7. The method according to claim 3, wherein the determining the normal vector of the certain vertex based on normal vectors of subdivision planes all containing the certain vertex comprises:
summing the normal vectors of the subdivision planes all containing the certain vertex; and
determining the normal vector of the certain vertex based on the summed normal vectors.

8. The method according to claim 2, wherein the method further comprises:
before the determining the flatness degree of each area based on the angle information of the subdivision planes in each area, dividing the three-dimensional model into a plurality of areas based on a preset radius.

9. The method according to claim 8, wherein the method further comprises:
after the determining the flatness degree of each area based on the angle information of the subdivision planes in each area, merging two adjacent areas in the three-dimensional model, in response to a difference between the flatness degrees of the two adjacent areas being less than a difference threshold.

10. The method according to claim 1, wherein the adjusting the key point density of the area based on the target key point density of the area comprises:
deleting some of the key points in a certain area in response to the key point density of the certain area being greater than the target key point density thereof, to make the key point density of the certain area after the deleting less than or equal to the target key point density of the certain area; and
reconnecting adjacent key points of the key points remained in the certain area as vertices.

11. An electronic device, comprising: a memory, a processor, and a computer program stored in the memory and executable on the processor, wherein the processor executes the program to implement a three-dimensional model processing method, the method comprising:
obtaining a three-dimensional model; wherein the three-dimensional model comprises a plurality of key points, and a plurality of subdivision planes obtained by connecting adjacent key points as vertices; the three-dimensional model comprises a plurality of areas;
for each area in the three-dimensional model:
determining a target key point density of each area based on angle information of the subdivision planes in each area; and
adjusting a key point density of each area based on the target key point density of each area.

12. The electronic device according to claim 11, wherein the determining the target key point density of the area based on the angle information of subdivision planes in the area comprises:
determining a flatness degree of each area based on the angle information of the subdivision planes in each area; and
determining the target key point density based on the flatness degree of each area.

13. The electronic device according to claim 12, wherein the angle information comprises normal vectors; each area comprises a plurality of vertices; the determining a flatness of the area based on the angle information of the subdivision planes in the area comprises:
for each area in the three-dimensional model:
determining a normal vector of each of the subdivision planes in each area;
determining a normal vector of a certain vertex based on normal vectors of subdivision planes all containing the certain vertex, to respectively determine a normal vector of each of the vertices of each area; and
determining the flatness degree of each area based on angles between normal vectors of adjacent vertices in each area.

14. The electronic device according to claim 13, wherein the method further comprises:
before the determining the flatness degree of each area based on angles between normal vectors of adjacent vertices in each area, performing a low-pass filtering for each of the vertices in each area of the three-dimensional model.

15. The electronic device according to claim 13, wherein the determining the flatness degree of each area based on angles between normal vectors of adjacent vertices in each area comprises:
determining the angles between the normal vector of each vertex and the normal vector of a correspondingly adjacent vertex in each area;
calculating an average value of the angles of each area based on the angles between the normal vector of each vertex and the normal vector of a correspondingly adjacent vertex in each area; and
determining whether each area is flat based on whether the average value of the angles of each area is greater than a preset angle threshold.

16. The electronic device according to claim 13, wherein the determining the normal vector of the certain vertex based on normal vectors of subdivision planes all containing the certain vertex comprises:
summing the normal vectors of the subdivision planes all containing the certain vertex; and
determining the normal vector of the certain vertex based on the summed normal vectors.

17. The electronic device according to claim 12, wherein the method further comprises:
before the determining the flatness degree of each area based on the angle information of the subdivision planes in each area, dividing the three-dimensional model into a plurality of areas based on a preset radius.

18. The electronic device according to claim 17, wherein the method further comprises:

after the determining the flatness degree of each area based on the angle information of the subdivision planes in each area, merging two adjacent areas in the three-dimensional model, in response to a difference between the flatness degrees of the two adjacent areas being less than a difference threshold.

19. The electronic device according to claim 11, wherein the adjusting a key point density of the area based on the target key point density of the area comprises:

deleting some of the key points in a certain area in response to the key point density of the certain area being greater than the target key point density thereof, to make the key point density of the certain area after the deleting less than or equal to the target key point density of the certain area; and reconnecting adjacent key points of the key points remained in the certain area as vertices.

20. A non-transitory computer-readable storage medium, storing a computer program, wherein the computer program is executed by a processor to implement a three-dimensional model processing method, the method comprising:

obtaining a three-dimensional model; wherein the three-dimensional model comprises a plurality of key points, and a plurality of subdivision planes obtained by connecting adjacent key points as vertices; the three-dimensional model comprises a plurality of areas;

for each area in the three-dimensional model:

determining a target key point density of each area based on angle information of the subdivision planes in each area; and adjusting a key point density of each area based on the target key point density of each area.

* * * * *